Dec. 16, 1958     H. E. BALSIGER     2,864,209
CRANK LOADER Filed July 21, 1955     6 Sheets-Sheet 1

INVENTOR
HAROLD E. BALSIGER
BY
*Hugh M. Roche*
ATTORNEY

Dec. 16, 1958 — H. E. BALSIGER — 2,864,209
CRANK LOADER
Filed July 21, 1955 — 6 Sheets-Sheet 2

INVENTOR
HAROLD E. BALSIGER
BY
ATTORNEY

Dec. 16, 1958 — H. E. BALSIGER — 2,864,209
CRANK LOADER
Filed July 21, 1955 — 6 Sheets-Sheet 3

Fig 4

INVENTOR
HAROLD E. BALSIGER
BY
ATTORNEY

Dec. 16, 1958  H. E. BALSIGER  2,864,209
CRANK LOADER
Filed July 21, 1955  6 Sheets-Sheet 4

INVENTOR
HAROLD E. BALSIGER
BY
ATTORNEY

Dec. 16, 1958   H. E. BALSIGER   2,864,209
CRANK LOADER

Filed July 21, 1955   6 Sheets-Sheet 5

INVENTOR
HAROLD E. BALSIGER
BY
ATTORNEY

United States Patent Office 2,864,209
Patented Dec. 16, 1958

2,864,209

CRANK LOADER

Harold E. Balsiger, Waynesboro, Pa., assignor to Landis Tool Company, Waynesboro, Pa.

Application July 21, 1955, Serial No. 523,429

19 Claims. (Cl. 51—215)

This invention relates to apparatus for placing workpieces, particularly crank shafts, in and removing same from a machine tool.

Automatic loading of crank shafts is not simply a matter of placing the workpiece in the machine. The crank must be placed in the machine in a predetermined angular position after which it may be necessary to rock the crank slightly for exact angular location. It may also be necessary to shift crank endwise in order to engage or disengage a locating pin.

It is therefore an object of this invention to provide a loading device for crank shafts which will have means not only for placing the crank in the machine but also for adjusting the crank angularly after it has been placed in the machine.

Another object is to provide means for shifting the crank endwise after it has been placed in the machine.

A further object is to provide clamping means on the loading device for gripping a workpiece.

A further object is to provide means for opening and closing said clamping means in accordance with the angular position of the loading device.

A further object is to provide means whereby the loading device will not move into work engaging position if the work clamps on the machine are closed.

Another object is to provide means for actuating the elevators in unison.

Figures 2, 3:
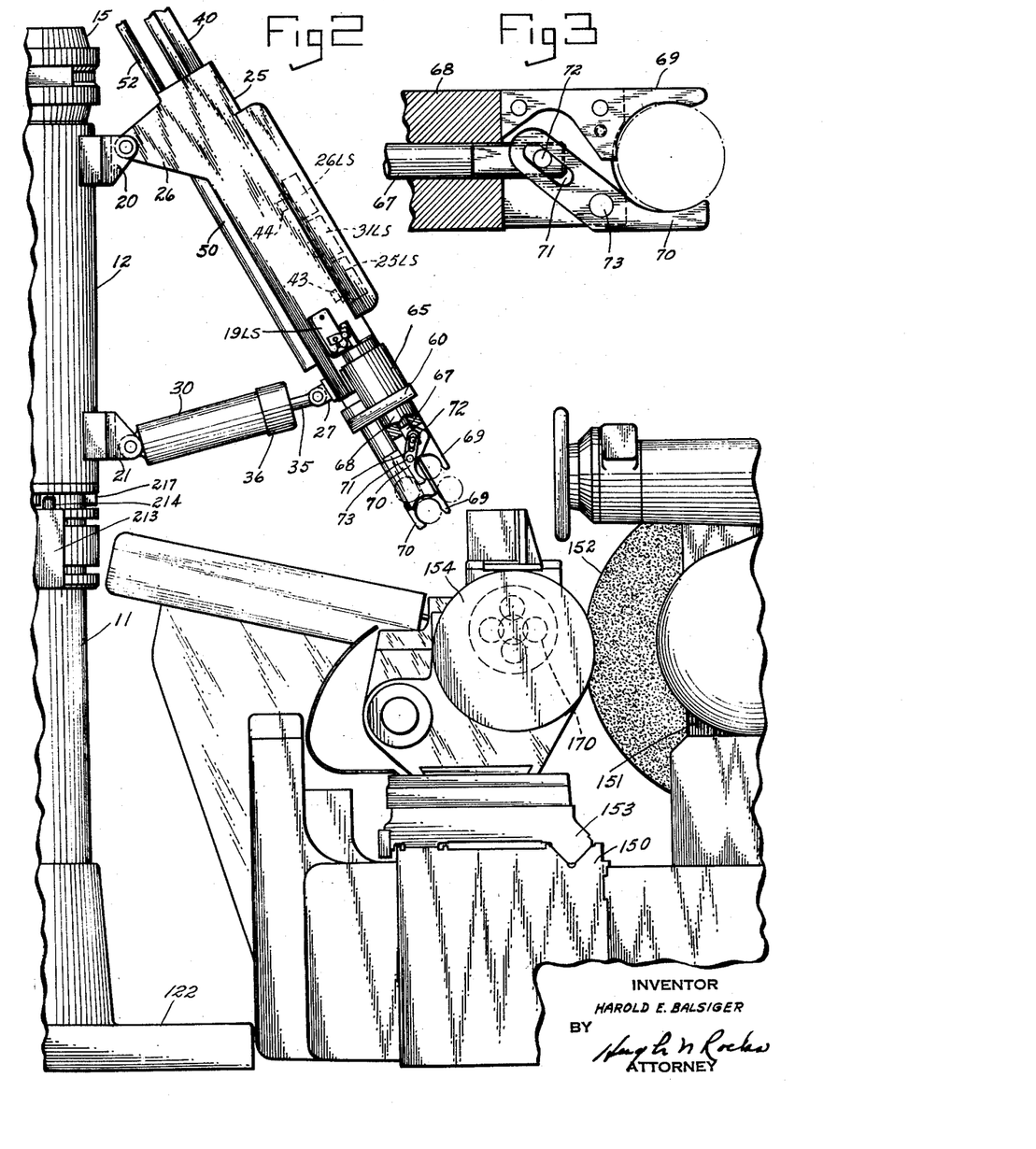
Figure 2 is a partial right hand end view also showing the relation between the loader and the work supporting portion of a crank grinder.
Figure 3 is a partial section showing the structure of the loader clamp.
Figure 4:
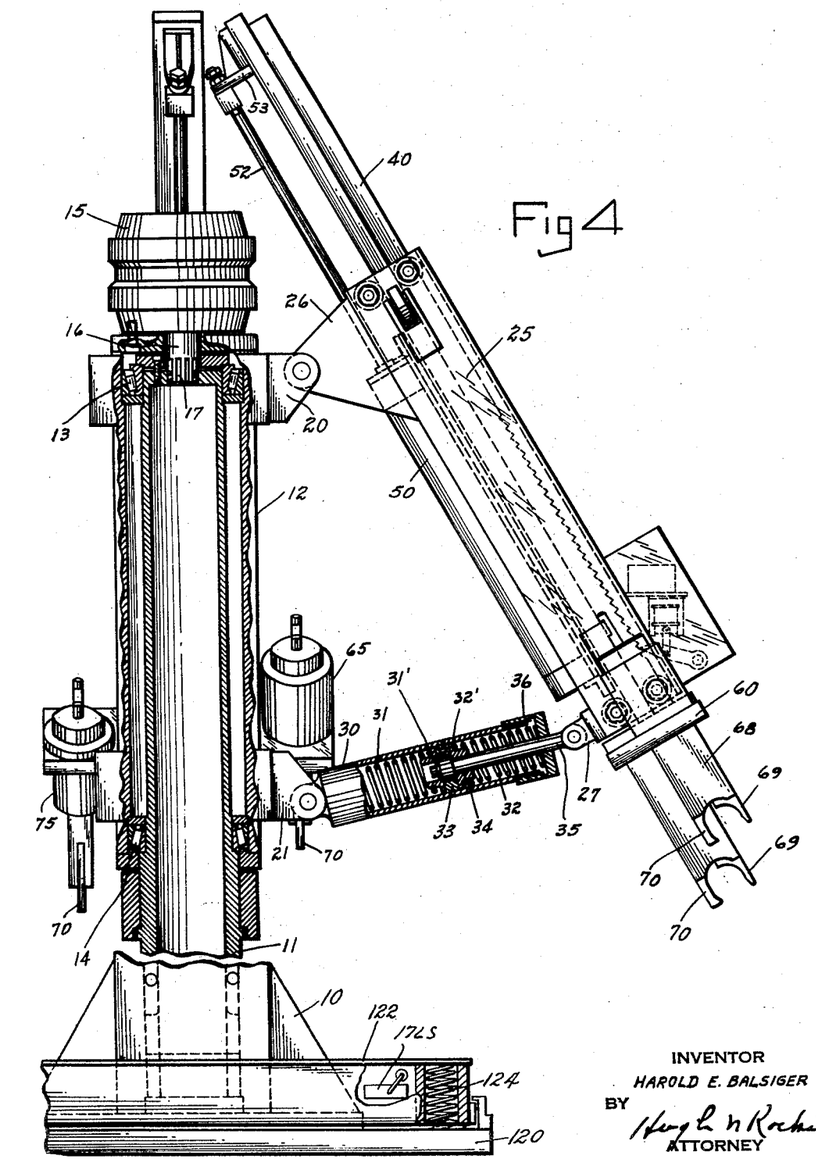
Figure 4 is an end elevation of the loading device partly in section.
Figures 5, 6:
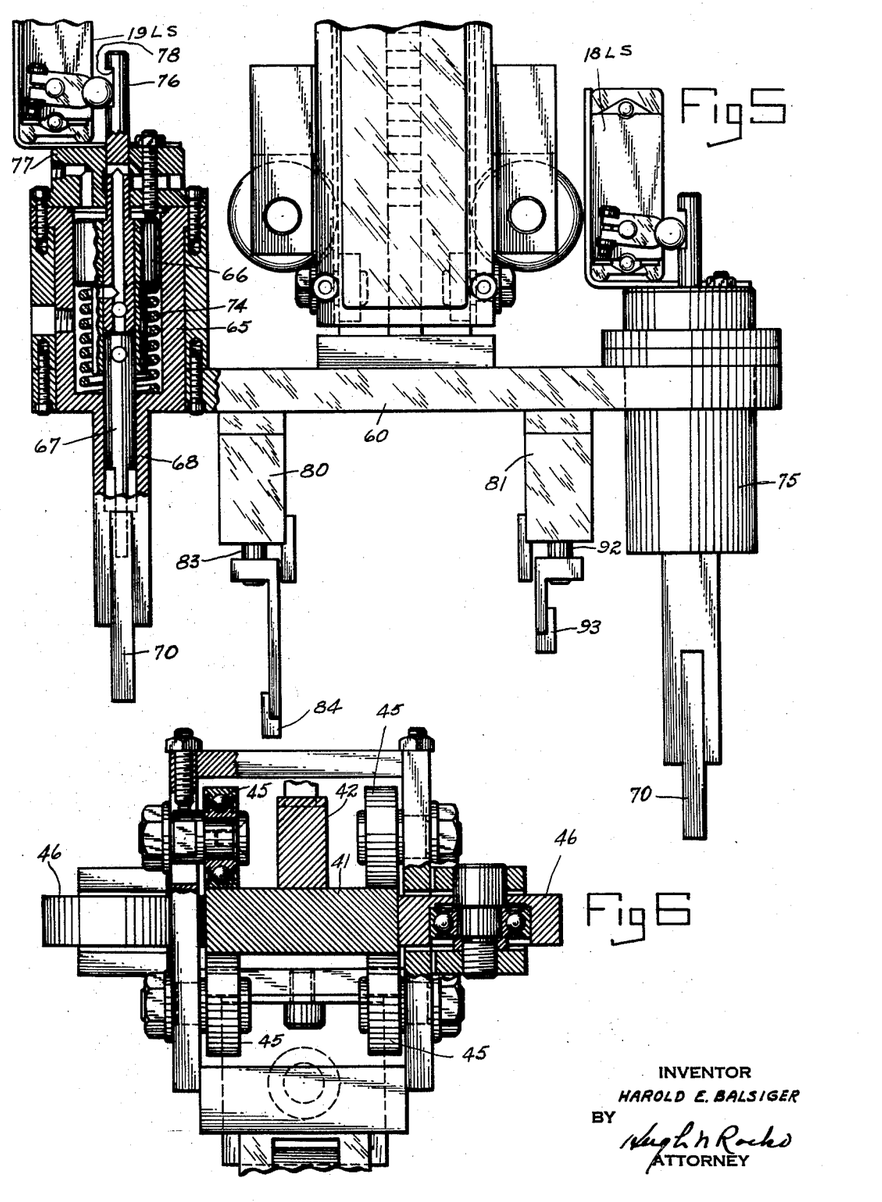
Figure 5 is a front end elevation partly in section of the portion of the loader which engages the workpiece, particularly the elements which rock the unground workpiece as it is placed in the machine.
Figure 6 is a sectional elevation of that portion of the loader which raises and lowers the workpiece.
Figure 7:
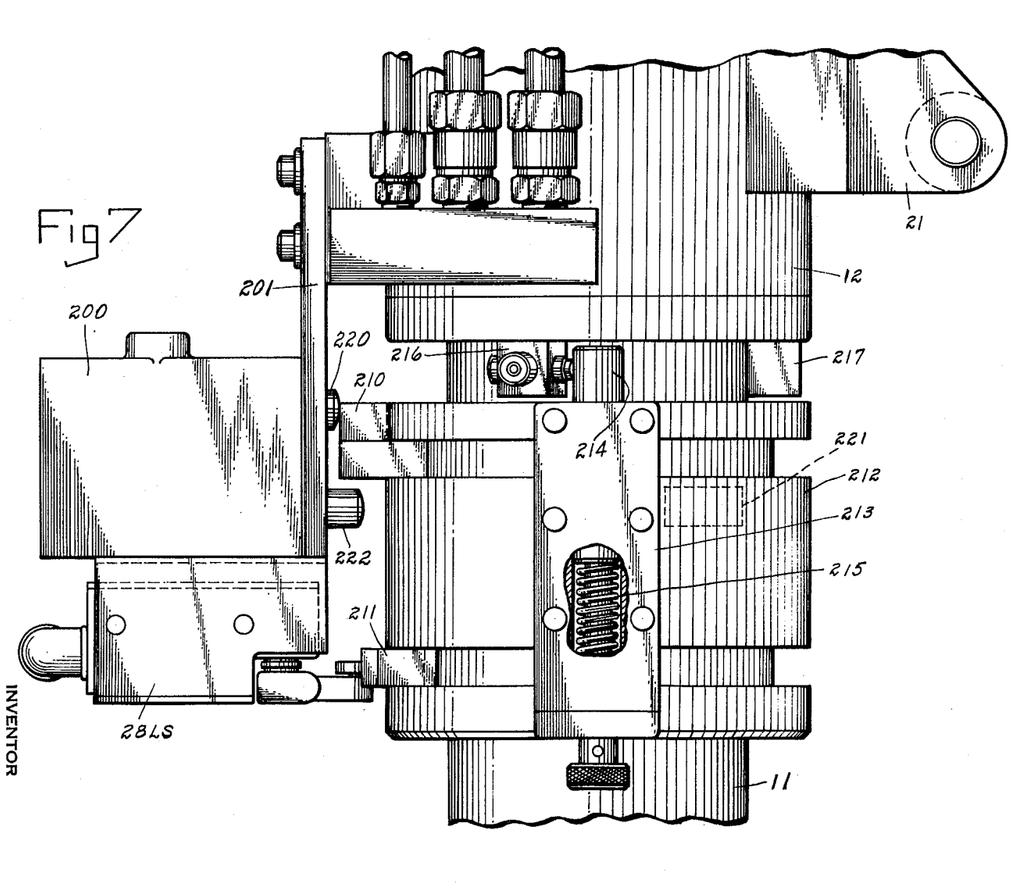
Figure 7 is a partial end elevation showing the means for actuating the cushion valve for the loader swivelling motor.

Numeral 10 indicates a base, 11 a column rigidly mounted on said base and 12 a sleeve rotatably mounted on said column on tapered roller bearings 13 and 14. At the top of said column is a hydraulic motor having a housing 15 attached to sleeve 12. Said motor has a shaft 16 with a splined portion 17 inserted in the top of column 11. Thus the rotating part of this motor is the housing while the shaft remains stationary. Axially spaced at the top and bottom of said sleeve are brackets 20 and 21. Said brackets support a work lifting device consisting of a loading member 25 having a bracket 26 pivotally attached to bracket 20. The corresponding brackets for the unloading member 25A are not shown. The lower portion of said support member has a bracket 27. The connection between the bracket 21 and support member 25 is a resilient apparatus consisting of a sleeve 30 pivotally attached to bracket 21 and having opposed springs 31 and 32 each having at its inner end a flanged member 31' and 32' respectively. Said flanged members engage a stationary abutment 33 in said sleeve, as well as a movable piston-like member 34 slidable in said abutment. A rod 35, which is attached to said piston, passes through a cap member 36 on said sleeve 30 and is pivotally attached to bracket 27 on support member 25. A slide member 40 has a horizontal portion 41 and a vertical portion 42 as seen in Figure 6. Said horizontal portion is slidably mounted between vertical rollers 45 and horizontal rollers 46. The means for actuating said slide consists of a cylinder 50 attached to support member 25 and having a piston 51 slidably mounted therein. Piston rod 52 is attached to bracket 53 on slide 40. At the lower end of slide 40 is a secondary support member 60 extending horizontally in both directions from said slide. At one end of said support member 60 is a cylinder 65 having a piston 66 slidably mounted therein. A piston rod 67 extends through an extension 68 of cylinder 65. The outer end of said extension is slotted to receive a finger 69 which is fixedly mounted in said slot and a clamp 70 which is pivotally mounted therein. The inner end of clamp 70 is bent inwardly to meet piston rod 67. Said piston rod is reduced in thickness at this point to fit the bifurcated inner end of clamp 70. Slot 71 in said finger slides on a pin 72 in said piston rod. Clamp 70 is pivotally mounted at 73 in extension 68 as shown in Figures 2 and 3 so that movement of piston 66 by spring 74 will rotate said finger in a counterclockwise direction to grip a workpiece 170. At the other end of support member 60 is a second cylinder 75, identical in detail with cylinder 65 and its associated parts except that it is mounted on support member 60 at or near its head end whereas cylinder 65 is attached to said support member near its rod end. The reason for this difference in mounting is that these particular work gripping devices are designed to grip the pins of a crankshaft which are in a predetermined angular position. An extension 76 of piston rod 67 passes through the head 77 of cylinder 65 and has a slot 78 therein, the purpose of which will be described later. A similar extension is used in connection with cylinder 75.

Attached to the underside of support member 60 are a pair of spaced cylinders 80 and 81. In cylinder 80 (Fig. 8), is a piston 82 having a piston rod 83 extending therefrom and having a work engaging member 84 which serves to engage one pin of a crankshaft. Cylinder 81 has slidably mounted therein, a piston 90 which is urged outwardly by a spring 91. A piston rod 92 has a work engaging member 93 mounted thereon to engage the opposite crank pin from that engaged by member 84. A pulsating power supply is attached to cylinder 80 so that piston 82 tends to rock a workpiece in one direction against piston 90 and spring 91. During the backoff portion of the pulsation, spring 91 and piston 90 will rock the workpiece in the opposite direction resetting piston 82 for the next rocking movement. The above described work elevating member is designed for placing an unground workpiece in a machine and will be referred to as a loading member.

A member 25A substantially identical with loading member 25A is mounted on sleeve 12 at a point angularly spaced approximately 90° from said loading member. The unloading member 25A differs from the loading member only in that it does not require any provision such as cylinders 80 and 81 for rocking the workpiece. Pinions 85 connected by a flexible shaft 87 and engaging rack teeth 86 on the vertical portions 42 of slides 40 cause said slides to operate in unison during a loading and unloading cycle.

Unground workpieces are supplied to said loading device on a conveyor 100 which has a limit switch 30LS which is actuated by a workpiece in position to be picked up by said loading member 25. At the other side of said transfer apparatus is a conveyor 105 having a limit switch 29LS which is actuated by a workpiece as it is released by the unloading member 25A. For the purpose of illustration, it may be assumed that the workpieces 170 move along the conveyors 100 and 105 by gravity. The load and unload members function in unison, and as will be described more in detail later, they will not move downwardly to pick up or deposit a workpiece unless one of the switches 29LS or 30LS is closed.

The base member 10 is in turn mounted on a platform 120 comprising a pivotally mounted plate 122 supported at one end by hinges 123 and at the opposite end by a spring 124. A limit switch 17LS is actuated when anyone steps on plate 120 and the means for swivelling the loading device is rendered inoperative.

The position of the loading device is identified as loading or unloading depending on which elevating member is connected to the workpiece while it is in the machine. If the workpiece has just been deposited in the machine, the apparatus is in loading position. If the workpiece is about to be removed from the machine the apparatus is in unloading position. When numeral I is between members 25 and 25A, the device is in loading position. When the members 25 and 25A are in the position marked II, the device is in unloading position.

Figure 1:
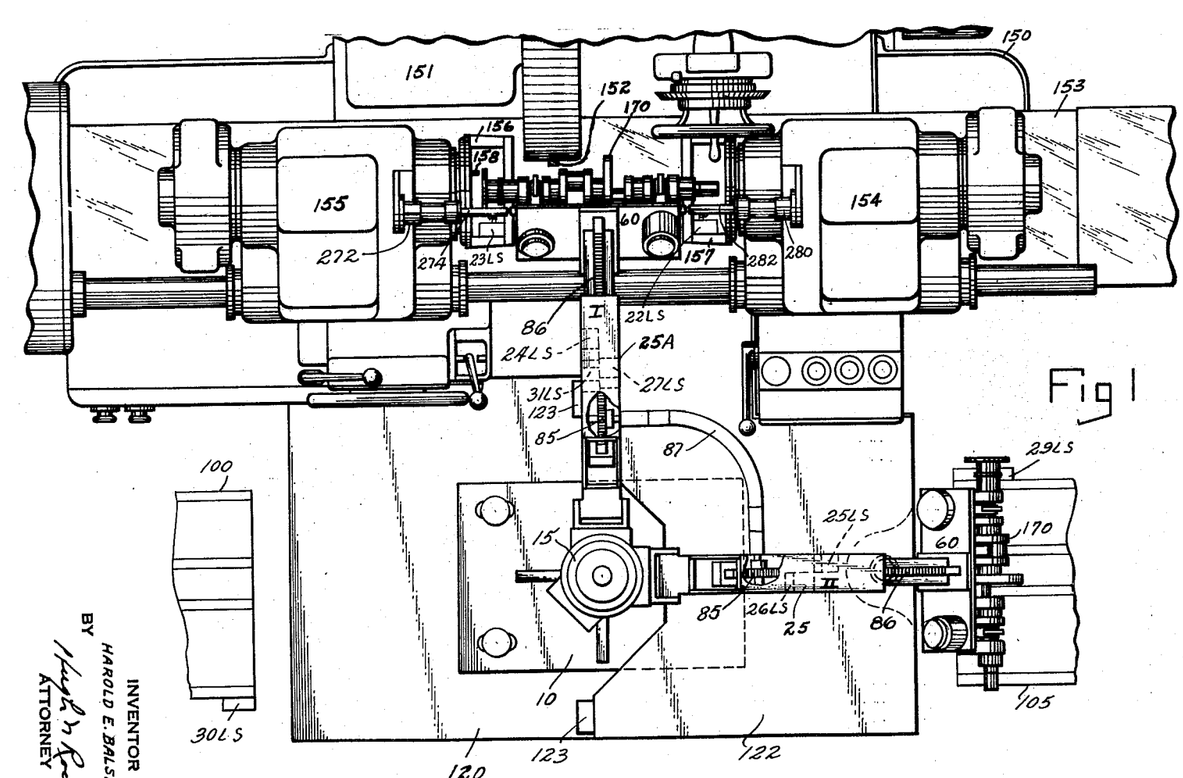
Figure 1 is a plan view of the loading device showing its relation to the work supporting members of a crank grinding machine.

Figure 1 shows the apparatus in loading position on a crank grinding machine. The portion of the machine disclosed includes a bed 150, a grinding wheel support 151 slidably mounted thereon and a grinding wheel 152 rotatably mounted on said wheel support. A work carriage 153 slidably mounted on bed 150 for movement axially of said wheel 152 has spaced work supporting members 154 and 155. A conventional hydraulic clamping device 156 is rotatably mounted on supporting member 155 and engages one end of a workpiece 170. Another clamping device 157 is rotatably mounted on work supporting member 154. The crank is angularly located by pin 158 entering a hole provided in the flange of the crank. In order to engage and disengage pin 158 in the hole of the flange of the crank, cylinders 272 and 280 are mounted on the work supporting members 155 and 154 respectively. A piston 281 in cylinder 280 has a piston rod 282 adapted to engage supporting member 60 to move the workpiece 170 to the left so that pin 158 will enter the hole in the flange of workpiece 170. Piston 273 in cylinder 272 has a piston rod 274 which engages said member 60 to shift a workpiece to the right to disengage said flange and said pin 158 at the end of a grinding operation so that the workpiece may be unloaded from the machine.

The means for cushioning the swivelling movement of the loader consists of a cushioning valve 200 (Fig. 8), suspended downwardly from sleeve 12 by means of a bracket 201. Underneath said cushioning valve is attached a limit switch 28LS. Said valve and limit switch are actuated by cams 210 and 211 respectively. Said cams are adjustably mounted on a collar 212 attached to column 11. A bracket 213 attached to said collar contains a plunger 214 urged upwardly by a spring 215 into the path of stop members 216 and 217 mounted at the lower end of column 12. The position of said stop members only determines the limit of movement of sleeve 12 and therefore the work carrying elevators. However, by withdrawal of plunger 214, the loader may be rotated in the position opposite to that normally used. Cam 210 actuates cushioning plunger 220 to cushion the swivelling movement of the loader in a clockwise direction. Another cam 221 engages cushioning plunger 222 when said cushioning valve and sleeve rotate in counter-clockwise direction. Cams 211 and 218 actuate limit switch 28LS to close either of two contacts at the end of each swivelling movement so as to select the functions of the various parts for each angular position of the loader.

*Operation*

In the following description of the operation of this invention, each contact of a relay is numbered and identified by adding said contact number to the relay number. For example 67CR1 is contact 1 of relay 67CR. For each contact which is normally closed, the letters NC precede the relay number. The letters LS used after a number relate to a limit switch. The letters PS mean pressure switch. The expression "transferred" means that the setting or position of the member referred to has been changed.

Figure 8:
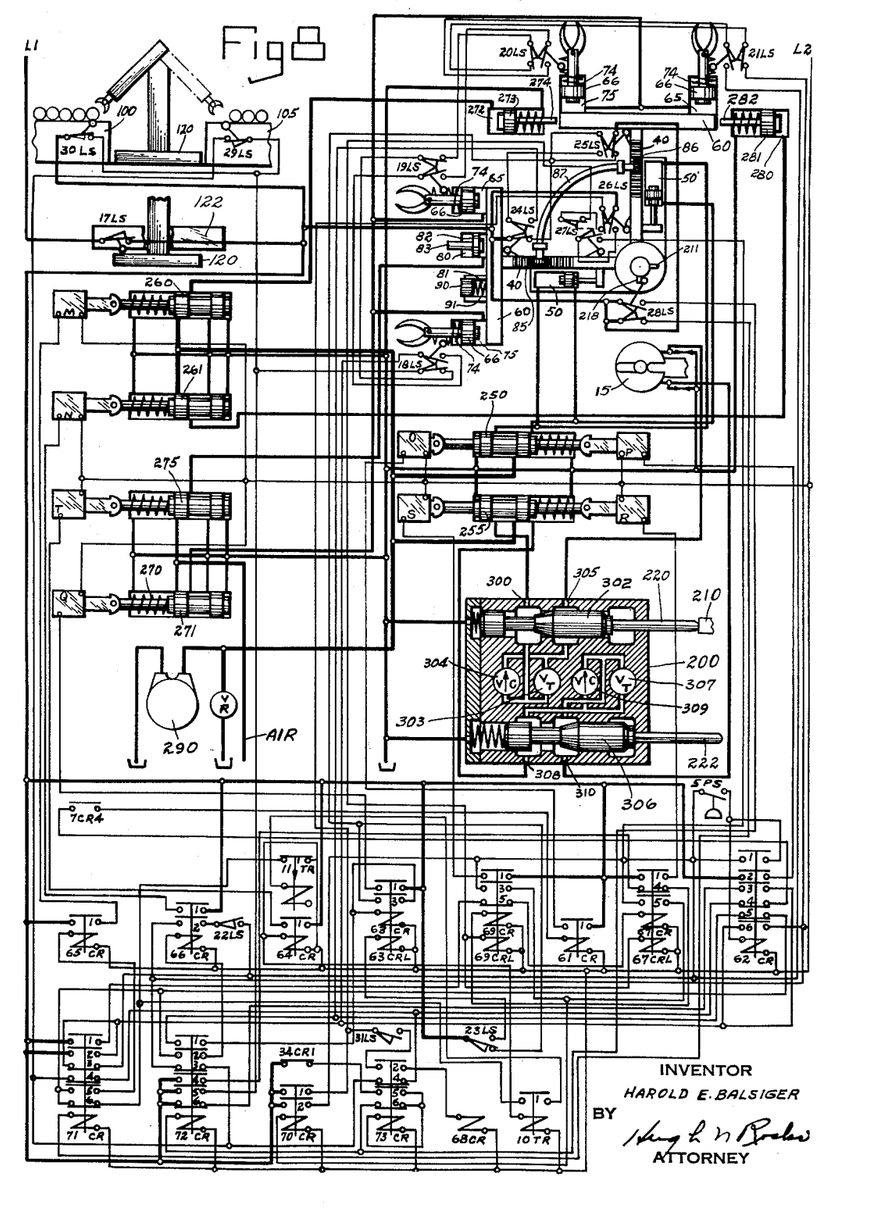
Figure 8 is a hydraulic and electric diagram.

At the end of a grinding operation in an automatic crank grinder, the loader is in counter-clockwise or unload position with the loader clamps open. In Figures 1 and 8, the loader is in position I, the clockwise or load position, in which an unground crank is placed in the machine and a ground crank is placed on conveyor 105. 63CR has been de-energized but is held by latch 63CRL (Fig. 8), so that the clamps will remain open until the latch is energized to release the relay. In this position, the column limit switch 28LS completes a circuit to energize 71CR. At the end of the grinding cycle suitable controls are actuated to energize a relay 7CR which acts through apparatus (not shown) to open machine clamps 156 and 157. At the same time, another contact 7CR4 closes and completes a circuit which includes 30LS, 18LS to 21LS, which are in clamp open position. NC72CR3, NC73CR4, and NC62CR4 to energize the elevator down relay 61CR.

61CR1 energizes valve solenoid 0 shifting elevator valve 250 to the right and directing fluid under pressure to the rod ends of cylinders 50 and 50' and causing slides 40 and 40' to move downwardly. 30LS is normally open and held closed by a workpiece. In the absence of a workpiece in the end position on the conveyor 100, 30LS would be opened and 61CR could not be energized to effect the downward movement of the elevator.

As the elevators move downwardly, two sets of limit switches are transferred, 24LS and 25LS which govern the operation of the loader clamps and the manipulation of the work as it is placed in the machine or removed from the machine, and 26LS and 27LS which control time and the direction of rotation of the loading mechanism between load and unload positions. 25LS is actuated by a cam 43 on slide member 40. 26LS is actuated by a cam 44 on slide member 40.

At the beginning of the downward movement of the elevators 26LS and 27LS are transferred and close a circuit through 67CR5 to energize 70CR. This circuit is held through 70CR2.

As the elevators reach the end of the downward movement 24LS and 25LS are transferred to complete a circuit from 23LS through 62CR5 and 71CR5 to energize relay 65CR. 65CR1 energizes solenoid M shifting valve 260 to the left and directing fluid under pressure to disengage cylinder 272 on the top of work supporting member 155 and adjacent the clamping device 156. Piston 273 in cylinder 272 moves to the right and piston rod 274 engages member 60 on the elevator to move said elevator slightly to the right carrying with it the crank to disengage said crank from the locator pin 158. This movement of disengagement piston 273 closes 23LS to complete a circuit to 63CR latch coil to release 63CR. In the de-energized position of 63CR, 63CR1 opens de-energizing solenoid Q and permitting spring 270 to shift valve 271 to the right. In this position cylinders 65 and 75 are connected with exhaust and pistons 66 actuated by springs 74 close the clamps 70 on the crank.

Closing the clamps transfers limit switches 18LS to 21LS to complete a circuit from 71CR2 through pressure switch 5PS which is actuated to energize 62CR by the same pressure which withdraws the latches (see Serial No. 548,962, filed November 25, 1955), which prevent the opening of the machine clamps 156 and 157. 62CR1 energizes solenoid P shifting valve 250 to the left and directing fluid under pressure to the head ends of elevator cylinders 50 and 50' to move the elevators upwardly. The upward movement of the elevators transfers 24LS and 25LS but no function is performed by these switches as a reusult of this transfer.

The upward movement of the elevators also transfers 26LS and 27LS to energize latch coils 67CR and 69CR. 67CR is already open as a result of the upward movement of the elevators in load position. 69CR is released and NC69CR5 closes to complete a circuit through 71CR1 to energize 67CR. Between the opening of 69CR and the closing of 67CR, the circuit to 70CR is opened momentarily to de-energize 70CR and therefore the latch coils for 67CR and 69CR to reset said latches. 67CR1 energizes solenoid R shifting valve 255 to the left and directing fluid under pressure from pump 290 to port 300 of the cushioning valve housing 200. Said fluid passes through check valve 304 and port 305 to motor housing 15 causing said housing and sleeve 12 to rotate in a clockwise direction in Figure 1 to load position. Exhaust fluid from the other side of said motor passes freely from port 310 to port 308 until cam 221 engages plunger 222 and shifts valve 306 to the left to separate ports 308 and 310. Fluid is then directed through throttle valve 307 to port 308 thus reducing the rate of discharge of motor 15 and cushioning the swivelling movement of the loader just before stop 217 engages plunger 214 in the clockwise or load position.

28LS is transferred to load position and energizes 72CR. 28LS also completes a circuit through normally closed 73CR6 to energize 73CR. 73CR is then held through 73CR5 which overlaps NC73CR6 and closes before NC73CR6 opens.

When the loader moves into load position a circuit is completed through 72CR5, 29LS, NC71CR4, NC62CR4, and 7CR4 to energize 61CR the elevator down relay. 61CR1 energizes solenoid 0 shifting valve 250 to the right and directing fluid under pressure to the rod ends of cylinders 50 and 50' to move the elevator slides 40 downwardly. If there is already a workpiece in the conveyor 105, 29LS will be opened, 61CR cannot be energized and the elevator will remain in the upper position.

As the elevators move downwardly in load position 24LS and 25LS transfer and complete a circuit through 72CR1 to energize 63CR. 63CR1 energizes solenoid Q which shifts valve 271 to the left and directs air to cylinders 65 and 75 to open clamps 70. At the same time 24LS and 25LS act through NC72CR2 to energize 66CR. 66CR1 energizes solenoid N to shift valve 261 to the left and direct fluid under pressure to engagement cylinder 280 to shift piston 281 and piston rod 282 against member 60 to urge the crank against locator pin 158. At the same time 24LS and 25LS act through NC62CR5, NC71CR6, and NC11TR1 to energize 10TR and rocker relay 64CR. 64CR1 energizes solenoid T which shifts valve 275 to the left directing air to the head end of cylinder 80 to urge piston 82 and piston rod 83 with work engaging member 84 in engagement with one of the pins of a crankshaft to rock said shaft against the action of spring pressed piston 90 in cylinder 81. When timer 10TR times out, 10TR1 is closed energizing 11TR. 11TR1 opens de-energizing 64CR and relieving the air pressure on cylinder 81 so that spring pressed piston 90 can rock the crank in the opposite direction. When 11TR times out NC11TR1 again closes, shifting 64CR and repeating the rocking action. With this rocking action and the endwise pressure on the crank, the crank flange moves on to the locating pin. The movement of engagement piston 281 transfers 22LS which completes a circuit from 66CR2 through 5PS to energize 62CR. 5PS remains closed until the latch is released to prevent opening of the machine clamps, then 62CR7 serves as a holding contact for 62CR.

62CR1 energizes solenoid P shifting valve 250 to the left and directing fluid under pressure from pump 290 to the rod end of cylinders 50 and 50' to cause the elevators to move upwardly. As soon as the elevators clear the work in the load position the cam 43 on slides 40 actuates 31LS which completes a circuit through 73CR2 to energize 68CR. 68CR acts to initiate the grinding cycle. As the elevators continue to move upwardly in load position 26LS and 27LS are transferred, latch coils 67CR and 69CR are energized and 67CR is released, closing NC67CR4 and completing a circuit through 72CR4 to energize 69CR. 69CR1 energizes solenoid S shifting valve 255 to the right and directing fluid through port 308 in valve housing 200. Said fluid passes through check valve 309 and out through port 310 to motor housing 15 causing said housing and sleeve 12 with attached loading mechanisms to rotate in a counter-clockwise direction in Figures 1 and 8 to unload position. 31LS is so located with respect to cam 43 that the grinding cycle begins as soon as the elevator clears the work in the machine. During the counter-clockwise movement to unload position II, exhaust fluid will be directed to port 305 in valve 200. From port 305 said exhaust fluid may pass freely to leave the valve through port 300. As the loader approaches the counter-clockwise position, cam 210 will engage plunger 220 shifting valve 302 to the left and directing said exhaust fluid to port 300 by way of throttle valve 303 to cushion the swivelling movement as stop 216 approaches plunger 214. The loader remains in this position with the clamps open until the end of the grinding cycle signals a repetition of the above described operation.

I claim:

1. Means for supplying rough workpieces to a machine tool and removing finished workpieces therefrom including a conveyor for conducting workpieces to a point adjacent the machine, a second conveyor for receiving finished workpieces and conducting them away from said machine tool, a transfer device having means movable toward and from said conveyor to remove a workpiece therefrom and place it in the machine, said transfer device also having means movable toward and from the machine for removing a workpiece therefrom and placing it on said second conveyor, control means actuated at a predetermined point in the operation of said machine tool for initiating operation of said transfer device, and means on said first conveyor adapted to be actuated by a workpiece to effect the operation of said control means only when the workpiece is in position to be removed by said transfer device.

2. Means for supplying rough workpieces to a machine tool and removing finished workpieces therefrom including a conveyor for conducting workpieces to a point adjacent the machine, a second conveyor for receiving finished workpieces and conducting them away from said machine tool, a transfer device having means movable toward and from said conveyor to remove a workpiece and place it in the machine, said transfer device also having means movable toward and from the machine for removing a workpiece therefrom, and means on said second conveyor adapted to be actuated by a workpiece to effect the operation of said transfer device only when there is room on said conveyor to receive a workpiece.

3. In a machine tool, means for rotatably supporting workpieces including a chuck, power means for opening and closing said chuck, a loading device for placing a workpiece in and removing same from said chuck, power means for actuating said loader and means responsive to opening of said chuck for actuating said power means to remove a workpiece from said machine tool.

4. In a machine tool, a loading device comprising a vertical supporting column, a sleeve rotatably mounted on said column, a pair of elevator support members pivotally mounted at the upper end of said sleeve and spaced substantially 90° thereon, a link connecting the lower part of each support with said sleeve and holding said support in predetermined inclined position, elevators slidably mounted in said supports and having gripping members at the lower end thereof, one of said members being arranged for placing a rough workpiece in the machine, the other of said members being arranged for removing a finished workpiece from the machine, and power means for rotating said sleeve and said elevator members between loading and unloading positions.

5. In a machine tool, a loading device comprising a vertical supporting column, a sleeve rotatably mounted on said column, a pair of elevator support members pivotally mounted at the upper end of said sleeve and spaced substantially 90° thereon, a link connecting the lower part of each support with said sleeve and holding said support in predetermined inclined position, elevators slidably mounted in said supports, and having gripping members at the lower end thereof, one of said members being arranged for placing a rough workpiece in the machine, the other of said members being arranged for removing a finished workpiece from the machine, power means for rotating said sleeve and said elevator members between loading and unloading positions, and adjustable means on said column for determining the range of rotation of said sleeve whereby said sleeve may be rotated through any angle and in any angular position on said column.

6. In a crank grinding machine, means for rotatably supporting a workpiece including a chuck, a locating pin in said chuck for locating the workpiece in predetermined angular position, a loading device for placing a workpiece in and removing same from said chuck, and means on said loading device and responsive to movement of said loading device for effecting a slight oscillation of said workpiece in said chuck in order to adjust said workpiece into operative relation with said locating means.

7. In a crank grinding machine, means for rotatably supporting a workpiece including a chuck, means in said chuck for locating the workpiece in predetermined angular position, a loading device for placing a workpiece in and removing same from said chuck, and means on said loading device for effecting a slight oscillation of said workpiece in order to adjust said workpiece into operative relation with said locating means including a pressure operated plunger for engaging one pin of said shaft and a spring operated plunger for engaging the pin opposite said first mentioned pin.

8. In a crank grinding machine, means for rotatably supporting a workpiece including a chuck, means in said chuck for locating the workpiece in predetermined angular posiiton, a loading device for placing a workpiece in and removing same from said chuck, and means on said loading device for effecting a slight oscillation of said workpiece in order to adjust said workpiece into operative relation with said locating means, and means operable simultaneously with said angular moving means for shifting said workpiece axially in the direction of said locating means.

9. In a crank grinding machine, means for rotatably supporting a workpiece including a chuck, means in said chuck for locating the workpiece in predetermined angular position, a loading device for placing a workpiece in and removing same from said chuck, and means on said loading device for effecting a slight oscillation of said workpiece in order to adjust said workpiece into operative relation with said locating means, and means operable simultaneously with said angular moving means for shifting said workpiece axially in the direction of said locating means, said loading device including means for removing a finished workpiece from said chuck and means operable when said loading means is in position to remove a workpiece for shifting said workpiece axially to dis-engage it from said locating means.

10. In a machine tool, a loading device comprising a supporting member, spaced work lifting devices mounted for vertical movement and also for horizontal movement on said support, one of said lifting devices serving to place rough workpieces in the machine, the other serving to remove finished workpieces from the machine, means to actuate said lifting devices simultaneously and means including a positive connecting device between said lifting devices to synchronize the movement thereof.

11. In a crank grinding machine, means for rotatably supporting a workpiece including a pair of chucks, a loading device having lifting means thereon movable in one direction to pick up a rough workpiece, means to transfer said loading device from pick up position to a work depositing position, a movable abutment on said lifting device for effecting a slight oscillating movement of said workpiece, and means for actuating said abutment only when said lifting device is in work depositing position including a limit switch, and means for closing said switch in response to movement of said lifting device.

12. A loading device for a crank grinding machine comprising a supporting column, a sleeve rotatably mounted on said column, a pair of elevator support members pivotally mounted at the upper end thereof to said sleeve in angularly spaced relation thereon, a link connecting the lower part of each of said supports with said sleeve and holding said supports in a predetermined inclined position, elevators slidably mounted in said supports and having work engaging members at the lower end thereof, power means for rotating said sleeve and said elevating members between loading and unloading positions and means responsive to upward movement of the elevators when they are in loading position for effecting rotation of said sleeve to the left and means responsive to upward movement of said elevators when they are in the unload position for causing said rotating means to operate to the right.

13. In a machine tool, a loading device comprising a support member, spaced work lifting devices mounted for putting workpieces in and removing workpieces from said machine and for transferring workpieces between said machine and a supply of workpieces, means for effecting said transfer movement to place said lifting devices in loading or unloading position, said work lifting devices having means for gripping or clamping a workpiece, one of said work lifting devices having means for effecting an oscillating movement of a workpiece and means on the machine for effecting a slight endwise movement of the workpiece to move it into or out of engagement with a positioning device, said gripping means and said oscillating means being operable only when said lifting devices are in downward position and means actuated by said transfer means for determining which of said devices shall function in loading position and which of said devices shall function in unloading position.

14. In a machine tool, a loading device comprising a vertical supporting column, a member movably mounted on said column for movement between a loading position for placing a workpiece in said machine and an unloading position for removing a workpiece from said machine, a pair of elevator support members pivotally mounted at the upper end of said column and spaced substantially 90° from one another thereon, a link connecting the lower part of each support with said column and holding said support in predetermined inclined position, elevators slidably mounted in said supports and having gripping members at the lower end thereof, one of said members being arranged for placing a rough workpiece in the machine, the other of said members being arranged for removing a finished workpiece from the machine and means for moving said elevator members between said loading and unloading positions.

15. In a machine tool, a loading device comprising a vertical supporting column, a pair of elevator support members pivotally mounted at the upper end of said column and spaced from one another thereon at an angle of 90°, a link connecting the lower part of each support with said column, said link comprising a cylindrical member attached to said column and a piston in said member and a piston rod attached thereto and pivotally connected to said support member, springs in said cylinder on either side of said piston for holding same in an intermediate position in said cylinder.

16. In a machine tool, a loading device comprising a vertical supporting column, a pair of elevator support members pivotally mounted at the upper end of said column and spaced from one another along said column, work carrying means slidably mounted on said support members, means for permitting a slight movement of said support members sufficient to compensate for variation in the operation of said loading device comprising a resilient telescoping link connecting the lower part of each support with said column.

17. In a machine tool, a loading device comprising a support member, spaced work lifting devices pivotally mounted on said support member for loading workpieces in and unloading workpieces from said machine and for transferring workpieces between said machine and a supply of workpieces, work carrying means slidably mounted on said lifting devices, and means for permitting a slight movement of said lifting devices sufficient to compensate for variation in the operation of said loading device comprising a resilient telescoping link connecting the lower part of each lifting device with said support member.

18. In a machine tool for performing a machining operation on a workpiece, work supporting means for gripping or releasing a workpiece, a work loader having means for picking up a workpiece and placing said workpiece in the machine and thereafter removing said workpiece from the machine and depositing said workpiece at a point adjacent the machine including spaced loading members movable to pick up and deposit workpieces, means to move said loading members to carry a workpiece to the machine and a finished workpiece away from said machine, and control means operable by said loading means after placing a workpiece in the machine for actuating said work supporting means to grip a workpiece and for setting said machine in operation.

19. In a machine tool for performing a machining operation on a workpiece, work supporting means for gripping or releasing a workpiece, a work loader having means for picking up a workpiece and placing said workpiece in the machine and thereafter removing said workpiece from the machine and depositing said workpiece at a point adjacent the machine including spaced loading members movable to pick up and deposit workpieces, means to move said loading members to carry workpieces to the machine and finished workpieces away from said machine, and control means operable at the end of a machining operation for actuating said work supporting means to release a workpiece and for starting said work loader.

References Cited in the file of this patent

UNITED STATES PATENTS

| | | |
|---|---|---|
| 1,616,276 | Orsik | Feb. 1, 1927 |
| 1,733,987 | Ingle | Oct. 29, 1929 |
| 1,933,225 | Smith | Oct. 31, 1933 |
| 1,933,226 | Smith | Oct. 31, 1933 |
| 1,950,040 | Smith | Mar. 6, 1934 |
| 2,033,449 | Romaine | Mar. 10, 1936 |
| 2,312,355 | Oberhoffken | Mar. 2, 1943 |
| 2,313,482 | Rocks | Mar. 9, 1943 |
| 2,623,429 | Meyer | Dec. 30, 1952 |
| 2,780,895 | Silven | Feb. 12, 1957 |